March 3, 1953 T. A. FEENEY 2,630,284
STICK FORCE PRODUCER AND GUST CONTROL
Filed Jan. 8, 1949 2 SHEETS—SHEET 1
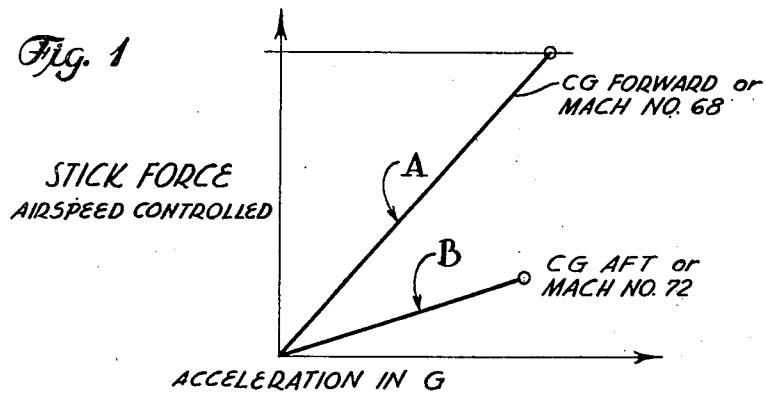
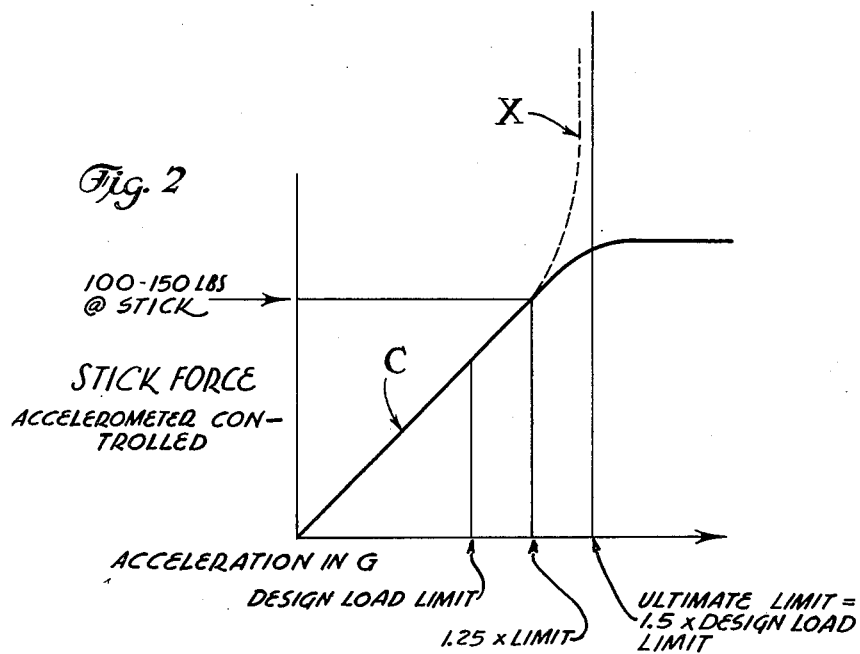
INVENTOR.
THOMAS A. FEENEY
BY
Herbert E. Metcalf
ATTORNEY

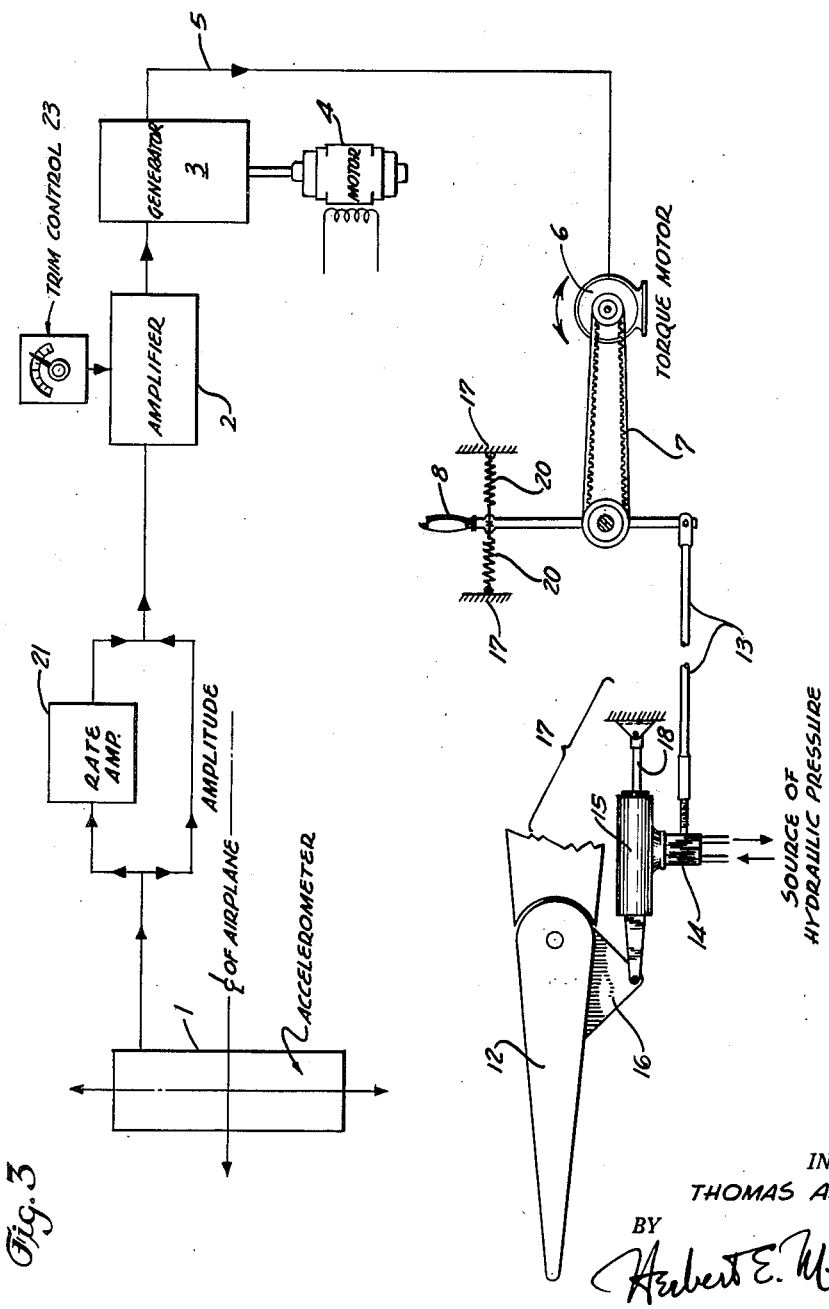

Patented Mar. 3, 1953

2,630,284

UNITED STATES PATENT OFFICE 2,630,284

STICK FORCE PRODUCER AND GUST CONTROL

Thomas A. Feeney, Los Angeles, Calif., assignor to Northrop Aircraft, Inc., Hawthorne, Calif., a corporation of California Application January 8, 1949, Serial No. 69,956

3 Claims. (Cl. 244—83)

My invention relates to a means and method of producing synthetic stick forces for airplanes, and more particularly to a means and method of producing such stick forces varying as a function of acceleration.

A number of modern high speed airplanes have the control surfaces thereof moved entirely under power controlled by pilot movements of a stick or control column. The control forces exerted by the pilot are low, do not reflect the loads imposed on the control surfaces and thus do not impart overload warnings to the pilot. In consequence, it is possible that the pilot may unwittingly subject the control surfaces and the airplane to loads far beyond the design limit of the structures. This is particularly true in conjunction with elevator control.

As the stick forces in a pilot's control element directly connected with the control surface vary with air speed, when a synthetic "feel" is desired for the stick or control column, due to the use of fully powered control surfaces, the stick forces have heretofore been generated by a force producer operated by differential air pressure developed by the air flow past the airplane. These forces are then transmitted to the stick to center the stick and thus simulate the feel of direct connected controls. A typical synthetic feel system of this latter type is shown, described and claimed in the Ashkenas application, Serial No. 52,367, filed October 1, 1948, now abandoned.

While synthetic feel systems producing stick forces varying as a function of air speed do give some measure of protection against overloading the airplane, they have not been found wholly satisfactory for this particular purpose in all airplanes for several reasons. The principal reason is that stick forces produced by the surfaces themselves or by a force producer operated by the air flow past the airplane in some airplanes may vary in accordance with a change in position of the center of gravity (C. G.) at the same air speed. Furthermore, in the case of some airplanes operating in the zone of mach number (M.) .6 to M. .8 the stick forces may actually decrease with respect to increased speed of the airplane so that large vertical accelerations can be imparted to the airplanes at high speeds, with only low stick forces apparent to the pilot.

In this respect, the term "vertical acceleration" as used herein refers solely to accelerations experienced by the airplane along a line normal to the center line (₵) of the airplane, this line being vertical when the airplane is in level flight. It is the accelerations imparted to the airplane along this line that must not excessively exceed design limits, and if stick forces are varied in accordance with such vertical accelerations instead of air speed, the pilot will at all times be warned by increasing stick force of the approach to dangerous overloads. As is customary, such accelerations are measured in gravity units (G).

Accordingly, it is an object of the present invention to provide a means and method of varying the stick forces on an airplane as a function of acceleration, particularly accelerations normal to the center line of the airplane in a plane that is vertical when the airplane is in normal level flight.

In prior stick force producing devices providing stick forces varying as a function of air speed, these forces have been applied to the stick merely as stick centering forces. I have found, however, that when a force producer is utilized that provides a force varying with acceleration, this force can be applied with advantage to the stick in a direction tending to move the stick to reduce the acceleration causing the forces, irrespective of the neutral position of the stick. The device of the present invention preferably is not necessarily a stick centering device, but a device which in the absence of other control, will move the stick to remove the acceleration producing the force. Thus, the device of the present invention is also an effective automatic gust alleviator. This and other objects and advantages of the present invention will be more fully understood by reference to the ensuing description of the attached drawings, in which:

Figure 1 is a graph showing how stick forces vary with respect to vertical acceleration with different C. G. positions in an airplane when these forces are produced as a function of air speed.

Figure 2 is a graph showing how stick forces are varied with respect to vertical accelerations when the stick forces are produced as a function of vertical acceleration.

Figure 3 is a diagram of a preferred system for producing stick forces varying with vertical acceleration of the airplane.

Referring to the drawings, and first to the diagram of Figure 1. This diagram shows two curves A and B plotted in terms of stick force against vertical acceleration force in G units of a particular airplane, with respect to the elevator control. Curve A shows the increase of stick force with G with the C. G. forward of the normal load balance, and curve B shows the relation of the stick force with respect to G with the C. G. aft of the normal position. Both of the curves represent conditions present when the control surfaces are directly connected to the stick or when the stick forces are applied by a force producer simulating the air loads on the control surface. As is well-known in the art, position of the C. G. of an airplane can vary under various changing load conditions in flight.

It is clear from the comparison of the two curves A and B that the same G load can be imparted to the airplane with the C. G. aft with only a small stick force to be opposed by the pilot, as will be imparted to the airplane with a much higher stick force to be opposed by the pilot with the C. G. of the airplane forward. It also happens that in the particular airplane from which the curves A and B were taken that curves A and B also roughly correspond to conditions where the airplane is flying at a velocity of mach number .68 for curve A and at mach number .72 for curve B. It is thus clear that stick forces produced by the control surface itself, or by an aerodynamic force producer applying stick forces to the pilot's control in accordance with air speed, do not impart any significant information to the pilot of the acceleration being imparted to the airplane. Far from being a safety warning, such stick forces in such high speed airplanes may be highly misleading as overload warnings, as the stick forces at curve B are much less than those of curve A for the same G's at much higher speeds.

As it is the vertical G load that is dangerous to the airplane, a real warning is provided when stick forces are varied with vertical accelerations, as shown in Figure 2.

Here, curve C shows that the stick forces increase as a function of acceleration up to the ultimate stress limit of the airplane which is generally held to be equal to 1.5 times the design load limit. In military airplanes in particular, it is desirable to permit the pilot to exceed the design load limit by a factor of 1.25 on occasion, but not to exceed 1.5 times design limit. The present invention provides a stick force curve such as curve C in Figure 2, and can provide stick forces as high as 100–150 pounds as 1.25 times the design limit is approached. In the particular airplane from which curves A and B of Figure 1 were derived, it is preferred to provide a stick force of 100–150 pounds at 2 G acceleration, corresponding in this case to 1.25 times design limit. Changes in C. G. location or air speed do not per se affect this curve.

Such a stick force can be obtained in one preferred manner, as set forth in Figure 3.

In Figure 3, an accelerometer 1 is positioned in the airplane with its acceleration responsive axis A normal to the center line ₵ of the airplane and vertical when the center line ₵ is horizontal with the airplane in level flight. This accelerometer may be of any precision variable resistance, variable reluctance, variable capacitance or variable inductance type, for example, to provide an output that will vary directly with the normal vertical acceleration of the airplane over a load range of zero to 1.5 times the design load limit of the airplane in G units.

As shown in Figure 3, the output of the accelerometer 1 is led directly to a main amplifier 2 which controls the output of a generator 3 driven by a separately excited motor 4. The generator output 5 is then led to a torque motor 6 connected by linkage 7 to move the control stick or column 8 of the airplane. Torque motor systems of the type described, together with the means for controlling them in accordance with the output of an amplifier, are well-known in the art.

As the elevators of an airplane are capable of imposing extremely high loads on an airplane when moved in flight, I prefer to connect stick 8 to control an airplane elevator 12. As the stick force producer of the present invention is ideally adapted for use when fully powered control surfaces are utilized, I indicate such a surface control by the connection of control link 13 to the stick 8, this link terminating in the valve spool (not shown) of a servo valve 14 attached to a hydraulic cylinder 15. Hydraulic cylinder 15 is attached at the base thereof to elevator operating arm 16 and a piston (not shown) inside the cylinder 15 is attached to the frame 17 of the airplane through a piston rod 18. The control stick is normally centered by opposed centering springs 20. This type of fully powered system is shown, described and claimed in my prior application filed April 27, 1948, Serial No. 23,567.

The electrical and mechanical circuits so far described respond only to the amplitude of the vertical accelerations applied to the airplane. Under these conditions, a certain amount of lag exists between the time the stick is displaced and the acceleration is developed on the airplane. It is, therefore, desirable to provide an "anticipator" in the circuit so that the power supplied to the torque motor will be a function of the rate of change of acceleration as well as of the actual value of the acceleration. This can readily be done by additionally providing a rate amplifier 21 between the accelerometer 1 and the main amplifier 2. Such rate amplifiers are well-known in the field of electrical autopilots. For example, an application of a rate amplifier in conjunction with a displacement amplifier is disclosed in U. S. Patent No. 2,487,793 to Esval et al. for Object Controlling Electric Motor System, and the details of such apparatus are shown, for example, in U. S. Patent No. 2,462,095, to Halpert et al. for Electrical Control Systems.

Under these conditions, the stick force will be high if the acceleration is changing rapidly even though the actual value of the acceleration may be relatively low.

The entire circuit is connected in such a manner that positive accelerations produce forward stick forces. As a result, if the airplane is flown hands-off by the pilot, accelerations tending to build up as a result of gust loads will be automatically relieved, since the motion of the stick is always under influence of the torque developed as a result of the acceleration, and is always in a direction which will tend to correct for the gust.

Normally, the system is adjusted so that the accelerometer null provides a torque motor null that corresponds to the neutral position of the stick and the neutral position of the elevators. Motion of the stick away from neutral in elevator controlling directions without causing vertical accelerations of the airplane will not cause the torque motor to act and the stick forces will, of course, be those developed by the centering springs alone. However, motions of the stick in elevator directions that do not produce vertical accelerations will be rare, and when accelerations develop as a result of stick movement, restoring forces will be applied by the torque motor which add to or subtract from the restoring force of the springs, and the acceleration reducing force of the torque motor will build up as the accelerations increase.

However, present day controls on an airplane are usually moved to place the airplane in a desired attitude and then are centered, or nearly so, after the desired attitude is assumed by the airplane. Under these conditions, the airplane can be placed in an attitude where the stick is centered but where vertical accelerations are building up, as in a dive for example. Under these conditions, the torque motor will tend to move the stick away from neutral in a direction to reduce the acceleration. If the pilot is holding the stick at neutral he will feel this force building up, or, if he is flying hands-off, the stick will be moved by the torque motor to relieve the acceleration.

Thus, under vertical acceleration of the airplane, at any position of the stick either a force will be applied to the stick which will have to be opposed by the pilot, thereby warning him of the acceleration, or if not opposed, the stick will move to reduce and eliminate the acceleration. The forces applied by the force producer have no necessary continuous relation to stick or control column neutral.

As the main amplifier 2 controls the torque motor null position, it is a simple matter to add a trim control 23 to this amplifier whereby the null position of the torque motor will differ from the null of the accelerometer. The torque motor will then move the stick against the force of one or the other of the centering springs 20 until torque motor force balances spring centering force. The stick is thus held in a new neutral. As the elevator is controlled by stick position, the elevator under these conditions will not be in neutral, but at one side thereof. This elevator displacement can then be made sufficient to balance an out-of-trim condition of the airplane, with the pilot operating from the new stick neutral. Thus, the present invention may also be utilized for elevator trim. Such manual control devices as this are also incorporated in conventional electrical autopilots, as shown by the hereinbefore referenced patent to Esval et al.

It will be noted from the curve C in Figure 2 that a system operating on this curve does not absolutely prevent overloading of the airplane but merely provides extremely high stick forces at high accelerations, but still forces that can be overcome by the pilot. Such an arrangement is desirable in military airplanes in order that the airplane can be loaded even to the so-called ultimate limit in an extreme emergency by exercise of extreme piloting forces. However, it may be desirable to have stick forces increase asymptotically as the ultimate limit is approached, to place the ultimate load limit beyond the strength of the pilot. This condition can be approached by adding non-linear amplifier characteristics, for example, to the system to obtain a desired rapid rise of torque approaching a desired ultimate limit, as indicated by dotted line X in Figure 2.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statue, the invention has been described in language more or less specific as to structural features, it is to be understood that the invention is not limited to the specific features shown, but that the means and construction herein disclosed comprise the preferred form of one mode of putting the invention into effect, and the invention is, therefore, claimed in any of its forms or modifications within the legitimate and valid scope of the appended claims.

What is claimed is:

1. In an airplane, a pilot's control stick, a control surface, power means directly connected to said control surface, controlling means for said power means, a rigid member extending only between said controlling means and said control stick to enable said control surface to be directly controlled by the pilot at all times; an accelerometer effective to respond to acceleration in either direction along an axis normal to the control surface, a torque motor connected to said accelerometer and energized in accordance with the output of said accelerometer, and means connecting said torque motor and pilot's control stick transmitting the effort of said torque motor to the pilot's column to provide a manually controllable force tending to move the stick in a direction to reduce excessive acceleration.

2. Apparatus in accordance with claim 1 including a rate amplifier operatively associated with said accelerometer and energized by the output of said accelerometer, and a second amplifier operatively associated with said accelerometer and energized by the output of said accelerometer and connected to said rate amplifier and to said torque motor to produce a torque on said control element varying as the amplitude and rate of change of said accelerations.

3. Apparatus in accordance with claim 2 and in addition comprising elastic centering means for the pilot's control stick; and a trim control unit connected to the second amplifier to enable the null position of the torque motor to be set different to that of the accelerometer and to cause the stick to be held in a new neutral position as required to balance an out of trim condition of the airplane.

THOMAS A. FEENEY.

REFERENCES CITED

The following references are of record in the file of this patent:

UNITED STATES PATENTS

| Number | Name | Date |
| --- | --- | --- |
| 2,125,361 | Schwarzler | Aug. 2, 1938 |
| 2,222,886 | Voigt | Nov. 26, 1940 |
| 2,400,017 | Miles | May 7, 1946 |
| 2,445,343 | Tyra | July 20, 1948 |
| 2,487,793 | Esval | Nov. 15, 1949 |

FOREIGN PATENTS

| Number | Country | Date |
| --- | --- | --- |
| 862,649 | France | Dec. 16, 1940 |